(12) United States Patent
Perry

(10) Patent No.: US 12,037,298 B1
(45) Date of Patent: Jul. 16, 2024

(54) PROCESS TO UTILIZE ORGANIC WASTE INTO A SOIL AMENDMENT

(71) Applicant: Justin Perry, Higley, AZ (US)

(72) Inventor: Justin Perry, Higley, AZ (US)

( * ) Notice: Subject to any disclaimer, the term of this patent is extended or adjusted under 35 U.S.C. 154(b) by 479 days.

(21) Appl. No.: 17/099,718

(22) Filed: Nov. 16, 2020

Related U.S. Application Data

(60) Provisional application No. 62/935,582, filed on Nov. 14, 2019.

(51) Int. Cl.
    *C05F 17/60*   (2020.01)
    *C05F 3/00*    (2006.01)
    *C05F 5/00*    (2006.01)

(52) U.S. Cl.
    CPC ............. *C05F 17/60* (2020.01); *C05F 3/00* (2013.01); *C05F 5/002* (2013.01)

(58) Field of Classification Search
    None
    See application file for complete search history.

(56) References Cited

U.S. PATENT DOCUMENTS

| | | | | |
|---|---|---|---|---|
| 2,969,279 | A  * | 1/1961 | Pierson | C05F 17/20 |
| | | | | 71/9 |
| 2010/0010089 | A1 * | 1/2010 | Van Dyke | C05F 11/02 |
| | | | | 514/568 |
| 2017/0081252 | A1 * | 3/2017 | Bright | C05F 17/979 |

* cited by examiner

*Primary Examiner* — Wayne A Langel
(74) *Attorney, Agent, or Firm* — Venjuris PC

(57) ABSTRACT

A method of processing raw organic material into a final soil amendment by collecting the raw material, aging it in mounds for a range of time. After aging, the material is ground up, stacked in piles, composted for a range of time to alter to a semi-composted material. This semi-composted material is reground, stacked in piles, and continued to compost for a range of time to alter to a final soil amendment of measurable moisture and nitrogen contents. The final soil amendment is mixed into farmland topsoil to facilitate improved crop growth and water retention.

8 Claims, No Drawings

PROCESS TO UTILIZE ORGANIC WASTE INTO A SOIL AMENDMENT

This patent application claims benefit of provisional patent application No. 62/935,582 which is incorporated by reference in its entirety as if fully set forth herein.

FIELD OF USE

The field of the present disclosure relates generally to agriculture, particularly fertilizers. More particularly, the process of utilizing semi-composted organics derived from various organic waste to create a sustainable soil amendment product that is applied to the top soil of a commercial farm operation.

BACKGROUND

A variety of green waste and other raw organic raw materials can be processed to create a variety of soil amendments, also called mulch or compost, to be applied to the top soil of a commercial farm operation. These types of green waste and other raw organic materials can include dead trees, dying trees, landscape waste, vegetable farm waste, animal farm waste, manure, and other forms of organic waste. The processes to make these soil amendments creates a product that is used to provide nutrients and structure to the soil for farming purposes.

The problems with currently used methods of processing raw organics is that only a portion of the raw organic material intake is utilized, creating undue waste with unusable raw material that will end up in landfills. Typically, unused raw material is not used in any active recycling system. Thus, currently used methods of processing are not really sustainable and/or do not create any carbon off-set in the process. In addition, the entire process of reducing raw organic material into a soil amendment can be energy-intensive, time consuming, and costly.

Another issue is the currently used processing methods make final products that do not utilize most of the raw material, producing final products having lower nitrogen content and less water retention capability. Additional synthetic petro-chemically derived fertilizers are used to supplement the lack of mobile nitrogen requiring the use of additional water irrigation is needed. Moreover, some soils can have a high alkalinity and high sodium levels, so that when manure is used as a processed or unprocessed soil amendment, it can add to the existing sodium and alkalinity problems because generally manure has high levels of both.

Another problem is dealing with an annual understanding of currently used soil amendment application rates to crops. What is needed is a yearly understanding of soil amendment application variables, which is complicated. And the currently used methods of processing a variety of soil amendments require a continued adaptation and understanding to use those currently used soil amendments. Growers of crops have to take into effect the positive and negative results from using currently used soil amendments of varying degrees including nutrient, nitrogen and water retention capability in order to make decisions of applying the variously created soil amendments.

Application rates of these the current soil amendments vary depending on weather, soil type, crops to planted, post application and time of the year. So the varying soil amendments all have different applications rates. Typically, this is why application rates and timing are critical. One of the challenges in developing a better soil amendment process has been establishing manageable and beneficial application rates with crop season.

Another consistent problem with the application rates of currently used soil amendments is mitigating the immobilization of nitrogen. Immobilization of nitrogen occurs when the accessible nitrogen species are taken up by microorganisms preventing them from being accessible by plants. The immobilized nitrogen may be available to plants after the microorganisms die and the nitrogen is released.

In cooler temperatures, slowed decomposition typically prevents the microorganisms from dying to release the nitrogen. Winter crops such as oats, wheat, barley and other cereal grains and cool season crops typically receive higher application rates of an organic soil amendment. Cooler ground temperatures slow decomposition rates, consequentially slowing and mitigating microorganism immobilization of nitrogen.

Cropland planted with summer or warm season crops like corn, sorghum, and Sudan grass must receive minimal application rates. Higher ground temperatures typically speed decomposition rates and increase the amount of immobilized nitrogen for a short duration but not over longer periods of the growing season. Warm season crops, especially corn are very sensitive to a nitrogen deficiency during the early stages of growth thus making the proper application rates of critical. Establishing acceptable and beneficial application rates of an organic soil amendment can take years of trial and error.

The currently used processes of creating further soil amendments produce a product that is typical of commercial composter's standard high temperature static pile compost and the method used to utilize it. Likewise, the currently used processes will make a product that delivers a deficient organic nutrient source for crops, does not improves soil structure, has no positive increase in soil microbial activity, does not provides a carbon source, and does not improves water retention of the soils treated. Since many farms do not integrating components of organic operations into their commercial farm operations, there is no opportunity to apply sustainable practices to those commercial farms and use a process to help with those problems.

This present invention was created to solve such issues.

SUMMARY

Soil amendment compositions and methods for their use are provided herein. The subject compositions are a method of aging collected organic material, processing the aged organic material into a final product of semi-composted organic material, and utilizing that final product for agricultural purposes. The subject compositions find use in a variety of different applications, including: the increase in organic nutrients; the improvement of organic nutrient transport; the improvement of soil characteristics. e.g. water permeability; the improvement of soil fertility; and other agricultural implements.

In a preferred method of processing organic waste into a soil amendment, the method comprises the steps of collecting organic material waste, aging of the initially collected organic material waste in a pile at least 50 feet wide, at some point, by at least 300 feet length, at some point, by at least 8 feet high, at some point, for at least 90 days to create a semi-composted material. Preferably, this semi-composted material is processed by grinding it into piece sizes less than 4 inches and adding water to prevent dust volatilization. Preferably this ground material is placed into mounds at least 4 feet high, at some point, and a least 6 feet wide, at some point. Preferable the ground semi-composted material is composted to a moisture content of 20% to 40% at a preferable temperature less than 160 degrees Fahrenheit until the moisture content in the semi-composted material is reduced to restrict further decomposition.

More preferably the semi-composted material is subject to re-grinding with a further adjusted consistency of at least 50% of piece sizes that are less than 1 inch, at least 30% of piece sizes between 1 inch and 2 inch, at least 15% of pieces 2 inch to 3 inch, and less than 5% of piece sizes that are 3 inches or greater. Preferably water is added to prevent dust volatilization.

Preferably, the re-ground semi-composted material is placed into mounds at least 4 feet high, at some point, and a least 6 feet wide, at some point, and composted at a preferable temperature of less than 160 degrees Fahrenheit from a preferable moisture content of 20% to 30% until moisture content in the semi-composted material is preferably at least 10% to restrict further decomposition.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

DETAILED DESCRIPTION OF EMBODIMENTS

A preferred embodiment of this process utilizes a lower-heat method to produce a semi-composted soil amendment that streamlines and simplifies the composting process. This preferably embodiment reduces overall cost and retain a higher nitrogen content in the final soil amendment produced. By using this soil amendment in commercial farm fields, chemical fertilizer use can be reduced and water retention of soils treated can increase. By incorporating this soil amendment into the topsoil of during tillage operations and flood irrigations of farmland, the soil amendment can continue to decompose at a more consistent rate.

This preferred process, as described, starts with raw organic material, preferably green vegetal organic waste. However, other raw materials like brown vegetal organic waste, dead trees, dying trees, palm fronds, landscape waste, vegetable farm waste, animal farm waste, manure, and other forms of organic waste can be collected. Preferably, the collected raw material is placed into loose piles with dimensions of at least 50 feet wide, at some point, at least 300 feet length, at some point, and at least 8 feet high, at some point. More preferably, these loose pile size dimensions can vary to a mound that is up to 200 feet wide at some point, up to 600 feet length, at some point, and up to 12 feet height, at some point. Preferably, the collected raw material is aged at least 90 days. In a more preferred embodiment, aging can continue for up to 365 days. Preferably the raw material is aged naturally and open to the environment.

It is believed that aging the collected material permits chemical bonds in the organic matter to break down as moisture content decreases. This chemical reaction allows the collected organic material to process more consistently. It is hypothesized that weather plays a role in the amounts of moisture and chemical compound advancement there is in the aging process. Preferably, this aged raw material convert to a semi-composted organic material have various consistency due to factors like the type of material collected, the time to age, and weather conditions the exposed collected material was subject to. Preferably, the aged semi-composted organic material is to be processed in an intermediate step.

In a preferred embodiment, developing this semi-composted organic material comprises a process using the means of an intermediate step. Preferably, this intermediate step begins using a horizontal grinder, but other processing equipment known in the farm industry can be used. In a preferred embodiment the grinder utilizes mastication to reduce the size of the semi-composted organic to pieces no greater than 4 inches in size. Preferably, at least 500 gallons of water is introduced to at least 200 tons of the semi-composted organic material while it is being ground up to help prevent dust volatilization. Preferably, the semi-composted organic material is ground at a temperature under 160 degrees Fahrenheit.

Preferably this ground, processed material is stacked in conical shaped or conical-like static discharge pile mounds. Preferably, these mounds are at least 4 feet high, at some point, and at least a 6 feet wide from an approximate center, at some point. More preferably these conical shaped or conical-like mound sizes can fluctuate as needed where the height can be up to 12 feet, at some point, and 25 feet wide, from an approximate center, at some point. An alternate preferable way to stack the ground, processed material is in windrow shaped mounds at least 8 feet wide at some point, at least 50 feet length at some point, and at least 5 feet height at some point. More preferably, these windrow mounds can vary as needed to pile sizes up to 12 feet wide, at some point, up to 250 feet length, at some point, and up to 7 feet height, at some point. Preferably the ground, processed material has an initial moisture content of at least 50%, but can have a more preferable moisture content of 30%. Preferably the mound is kept at a temperature of under 160 degrees Fahrenheit. If the temperature begins to increase above 160 degree Fahrenheit, the mound can preferably be shifted and aerated as needed to keep the optimum, preferred temperature of under 160 degrees Fahrenheit. Preferably the mound can be covered or uncovered with material common to farming operations to regulate variables effecting composting.

In a preferred embodiment the ground semi-composted material continue to age in these static piles at the preferred temperature of under 160 degrees Fahrenheit till a preferable moisture content range of 20% to 40%. Once this preferable 20% to 40% moisture content is reached, the composting can continue for at least 7 days till a preferable moisture content range of 10% to 30% is reached. Preferably the ground semi-composted material can further be composted at under 160 degrees Fahrenheit for less than 60 days to reach a preferable moisture content at least 10% but the moisture content can be up to 20%. This ground semi-composted material can be used in crop application and assist in farmland growing of crops. But it is preferable to re-grind the semi-composted organic material for a second round of composting.

After the ground semi-composted material has rested for the preferable times and to the preferable moisture content, it is more preferably processed again by re-groundung using a horizontal grinder, or other processing equipment. This re-ground semi-composted organic material is processed again with a preferable amount of at least 500 gallons of water is introduced to at least 200 tons to help prevent dust volatilization. The re-ground semi-composted organic material is ground at a preferable temperature under 160 degrees Fahrenheit. This semi-composted material is ground to a further adjusted consistency to preferably to include at least 50% and more preferably up to 60% of pieces that are less than 1 inch, preferably at least 30% of pieces 1 inch to 2 inch, preferably at least 10% and more preferably up to 15% of piece sizes that are 2 inches to 3 inches and preferably at least less than 5% of pieces that are 3 inches or greater.

Preferably, the re-ground semi-composted material continue to compost further in these static piles at the preferred temperature of under 160 degrees Fahrenheit till a preferable moisture content range of 20% to 30%. Once this preferable 20% to 30% moisture content is reached, the composting of this re-ground material can continue for at least 7 days till a preferable moisture content range of 10% to 30% is reached. Preferably the re-ground ground semi-composted material can further be composted at under 160 degrees Fahrenheit for less than 60 days to reach a moisture content preferably at least 10% and, more preferably, less than 20%.

Preferably this re-ground, processed material is stacked in conical shaped or conical-like discharge static pile mounds. Preferably these mounds are at least 4 feet high, at some point, and at least 6 feet wide from an approximate center, at some point. More preferably conical shaped or conical-like mound sizes can fluctuate as needed where the height can be up to 12 feet, at some point, and 25 feet wide from an approximate center, at some point. An alternate preferable way to stack the ground, processed material is in windrow shaped mounds at least 8 feet wide, at some point, at least 50 feet length, at some point, and at least 5 feet height, at some point. More preferably these windrow mounds can vary as needed to pile sizes up to 12 feet wide, at some point, up to 250 feet length, at some point, and up to 7 feet height, at some point. There-ground, processed material has a preferably initial moisture content of at least 50%. The mound is preferably kept at a temperature of under 160 degrees Fahrenheit. If the temperature begins to increase above 160 degree Fahrenheit, the mound of re-ground material can preferably be shifted and aerated as needed to keep the optimum preferred temperature of under 160 degrees Fahrenheit. The mound can be covered or uncovered with material common to farming operations to regulate variables effecting composting.

Keeping the re-ground semi-composted material at a preferred temperature of under 160 degree Fahrenheit assists to contribute increased amounts of nitrogen content while continuing to composting preferably increasing the nitrogen content. It is believed the soil will capture more nitrogen during the decomposition process post application using this methodology. It has surprisingly been found that by restricting any further decomposition of the finished pre-application ground material, a higher amount of nitrogen can be retained and costs can be minimized.

After the re-ground semi-composted material is finished aging, the end product is a mulch as a soil amendment compost, which can be preferably applied directly to cropland. The final soil amendment preferably has a moisture content below 10% to prevent further composting of the final soil amendment before topsoil application, retaining nitrogen concentrations. The soil amendment has a preferably nitrogen content of at least 2% by weight. The final moisture content, chemical composition and range of material sizes allows for varying rates of decomposition after application and incorporation. It is believed that it is important to control the mitigating immobilization of nitrogen. It is believed that this helps control living microorganisms in the soil amendment that can consume the free nitrogen in the final mulch, which would prevent the nitrogen from being accessible to plants.

It is believed that the immobilized nitrogen becomes transportable as the microorganisms die and the nitrogen is released. When temperatures cool, the slowed decomposition of those mulch microorganisms decreases the rate of release of decomposition-releasing nitrogen. This slows the mitigation of immobilization of nitrogen. As temperatures rise, the microorganism decomposition increase, boosting the free nitrogen availability in the mulch. It is believed that the finer pieces of mulch material decomposes at a faster rate, giving treated soils a readily available source of nitrogen and carbon. It is believed that larger fragments of mulch material decompose at a slower rate, allowing nutrients, nitrogen and carbon be release at a slower rate throughout a crop cycle.

It is believed that material size differences of the final soil amendment and fluctuating weather conditions like moisture and temperature relates to the variance in decomposition rates directly, and relates to the decomposition process that takes place after application of material to cropland. During this process free nitrogen in the soil may be immobilized by microorganisms and therefore not available to plants. It is believed that not all the nitrogen is fixed or immobilized and application rates of material have a direct effect on the degree of immobilization. Moreover, it is believed that the time of year in which material is applied also effects the amount of immobilization. While the nitrogen immobilized in the decomposition process will become available as free nitrogen in the soil, and the nitrogen in the decomposed mulch as well. Usually it is not quickly enough for the plants during the crop cycle immediately following application.

Once the preferably final mulch material is created, it may be applied and incorporated into the topsoil and irrigation takes place, giving adequate moisture for decomposition to continue. It is believed that a significant portion of decomposition happens post application and incorporation into the soil. It is believed that application rates and timing of the application are critical to the success of the process. This process has been subject to multiple trial and error experimentation methods to determine optimal compost application rates and proper timing of the application of the final soil amendment.

It is also believed that application of the final mulch compost previous to the planting of cool weather crops (cereal grains, fall/winter forage varieties) is greatly increased. Application rate will vary from preferably amount of 30 to 70 tons of compost per acre. This varies depending on soil type, for example, heavier clay soils rates reduce application rates, while lighter sandy or silty type's soils require an increased application rate. Likewise cooler ground temperatures during the fall and winter months slow the rate of decomposition, allowing the mitigation of the nitrogen immobilization by preventing rapid decomposition on a large amount of the final soil amendment composted organic material. It is believed an increase in application rates in the cooler months can increase soil humus and nutrient content while controlling or mitigating immobilization of nitrogen and is a key to control the immobilization of nitrogen. It is believed that nitrogen immobilization creates a shortage of available nitrogen which can have an adverse effect on the crop stunting growth and decreasing yields.

Before planting spring and summer crops (corn, sorghum, Sudan grass, alfalfa) application rates may decrease to a preferable amount of 15 to 30 tons per acre depending on soil type (clay, sandy, or silty). Warmer ground temperature increases decomposition rates of applied organic material. It is believed that with decreased application rate the potential for immobilization of nitrogen is mitigated. Rapid decomposition degrees on heavy application rates will immobilize nitrogen during critical stages of plant growth. Preferably, proper application rates and proper timing of the application of partially decomposed compost are valuable. Developing this preferred process has surprisingly overcome challenges in establishing manageable and beneficial application rates with crop season.

It is believed that another benefit to this final soil amendment is the incremental increase in carbon content when the soil amendment is added to farmland topsoil. As the preferable topsoil/final soil amendment is used, it is believed that this current method increases carbon release. It is believed that sufficient carbon is essential to allow nitrogen to be absorbed by the plants. Continued use of this final soil amendment created by the currently discussed process is believed to allow synthetic fertilizers or other non-organic compost to be phased out of topsoil mixing, which will increase the natural carbon to be recycled and released.

Once this final mulch is preferably added and incorporated into topsoil, decomposition varies depending on the amount of top soil and soil amendment that is mixed and the amount of mixture that is rested on the top of the growing field. A preferable topsoil/final soil amendment mixture of three-fourths inch or smaller will decompose in at least 30 days. A preferably 1 inch to 2 inch of topsoil/final soil amendment mixture can decompose in at least 60 day. A preferably 2 inch to 4 inch topsoil/final soil amendment mixture can decompose in at least 90 days. These are optimum preferable decomposition rates, but there can be variations of those rates depending on factors like the initial material collected, the moisture content of the final soil amendment, the nitrogen content of the final soil amendment, and weather patterns the farmland topsoil/soil amendment mixture is subject to during the growing season.

In the preferred embodiment, this process is to utilize organic material to create a soil amendment to be applied to commercial farm operations, but can be used for any entity that wants to add this soil amendment to their top soil.

In the preferred embodiment, the soil amendment portions should not be too big, as it can obstruct plant growth, damage delicate ground engaging equipment (such as planters), can float during flood irrigation, accumulate in undesirable quantities and concentrate in quantities that have a negative effect on crop growth.

In the preferred embodiment, the soil amendment produces the desired results of optimized application rates and decomposition rates once utilized on cropland topsoil for seasonal crops. This allows warm season crops to have a decomposition that does not immobilize nitrogen and cool season crops to decompose at a slower rate.

While the invention has been illustrated and described in detail in the foregoing description, documents, drawings, and charts provided, the same is to be considered as illustrative and not restrictive in character, it being understood that only the preferred embodiment has been shown and described and that all changes and modifications that come within the spirit of the invention are desired to be protected.

What is claimed is:

1. A method of processing organic waste into a soil amendment, the method comprising the steps, in order, of:
    collecting organic material waste;
    aging of the initially collected organic material waste for at least 90 days in a pile at least 50 feet wide, at some point, by a least 300 feet length, at some point, by a least 8 feet high, at some point, for at least 90 days to create a semi-composted material;
    grinding the semi-composted material into piece sizes less than 4 inches using a horizontal grinding machine and adding water to prevent dust volatilization;
    placing the ground semi-composted material into mounds or windrows;
    composting the ground semi-composted material to a moisture content of 20% to 40% at a temperature less than 160 degrees Fahrenheit until the moisture content in the semi-composted material is reduced to restrict further decomposition.

2. The method of claim 1 comprising the further steps of re-grinding the ground semi-composted material with a further adjusted consistency of less than 4 inches and adding water to prevent dust volatilization, placing the re-ground semi-composted material into mounds or windrows and composting the re-ground semi-composted material at a temperature of less than 160 degrees Fahrenheit to a moisture content of 20% to 30% until moisture content in the re-ground semi-composted material is at least 10% to restrict further decomposition and containing at least 2 weight percent nitrogen.

3. The method of claim 1 wherein the step of aging of the initially collected organic material waste for at least 90 days in a pile at least 50 feet wide, at some point, by a least 300 feet length, at some point, by a least 8 feet high, at some point, for at least 90 days to create a semi-composted material is less than 365 days.

4. The method of claim 1 further comprising the step of additionally composting for at least 7 days the ground semi-composted material to a moisture content of about 10% to 30%.

5. The method of claim 1 further comprising the step of additionally composting for less than 60 days the ground semi-composted material to a moisture content of at least 10%.

6. The method of claim 1 wherein the step of collecting organic material waste includes landscape waste.

7. The method of claim 1 wherein the step of collecting organic material waste includes landscape waste including palm frond waste.

8. The method of claim 1 wherein the step of collecting organic material waste includes animal waste.

* * * * *